(12) United States Patent
Kiet et al.

(10) Patent No.: US 9,338,244 B2
(45) Date of Patent: *May 10, 2016

(54) REMOTE VIRTUAL SUPERVISION SYSTEM (71) Applicant: Gold Post Technologies, Inc., Las Vegas, NV (US)

(72) Inventors: Quyen Kiet, Anaheim, CA (US); Barry Goldstein, Las Vegas, NV (US)

(73) Assignee: Gold Post Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/660,509

(22) Filed: Mar. 17, 2015

(65) Prior Publication Data

US 2015/0195367 A1  Jul. 9, 2015

Related U.S. Application Data (63) Continuation of application No. 13/683,762, filed on Nov. 21, 2012, now Pat. No. 9,001,984, which is a continuation-in-part of application No. 13/547,666, filed on Jul. 12, 2012, now Pat. No. 8,804,915.

(60) Provisional application No. 61/559,352, filed on Nov. 14, 2011.

(51) Int. Cl.
*H04M 11/00* (2006.01)
*H04L 29/08* (2006.01)
*G06Q 10/06* (2012.01)
*G06Q 50/00* (2012.01)
*H04L 12/18* (2006.01)

(52) U.S. Cl.
CPC ............... *H04L 67/22* (2013.01); *G06Q 10/06* (2013.01); *G06Q 10/063* (2013.01); *G06Q 50/01* (2013.01); *H04L 12/1822* (2013.01)

(58) Field of Classification Search
CPC . G06Q 10/06; G06Q 10/0635; G06Q 50/265; G06Q 50/22; G06Q 10/063; G06Q 50/26; G08B 21/0423; G06F 19/3431; G06F 19/363; H04L 67/22
See application file for complete search history.

(56) References Cited

U.S. PATENT DOCUMENTS 9,001,984 B2 * 4/2015 Kiet et al. ............... 379/106.02
2003/0037063 A1 * 2/2003 Schwartz ................. 707/104.1

* cited by examiner

Primary Examiner — Stella L Woo
(74) Attorney, Agent, or Firm — Wang Law Firm, Inc.

(57) ABSTRACT

A server includes a data communication controller and an analyzer for monitoring social changes in a neighborhood and providing indicators to appropriate agencies. The data communication controller receives from a plurality of information sources, through a telecommunication network, a plurality of social behaviors for a particular neighborhood and a plurality of monitoring criteria. The analyzer assigns a weight for each social behavior according to the monitoring criteria, calculates a total score for the monitoring criteria, compares the total score against the monitoring criteria, and generates an indicator if the total score matches a criterion in the monitoring criteria. The data communication controller sends the indicator to a third party agency.

12 Claims, 12 Drawing Sheets

| Score | Ranking | Explanation |
|---|---|---|
| 25+ | Reject | Automatic rejection as candidate for community supervision |
| 21-24 | Review | Further review needed before release |
| 0-20 | Release | Good candidate for community supervision |

| Score | Ranking |
|---|---|
| Up to 29 | 1 |
| 30-35 | 2 |
| 36-42 | 3 |
| 43 and up | 4 |

FIG. 15

REMOTE VIRTUAL SUPERVISION SYSTEM

RELATED APPLICATION

This application is a continuation of and claims benefit to the U.S. patent application Ser. No. 13/683,762, filed on Nov. 21, 2012, which is a continuation-in-part of and claims benefit to the U.S. patent application Ser. No. 13/547,666 for Remote Virtual Supervision System, filed on Jul. 12, 2012, now a U.S. Pat. No. 8,804,915 issued on Aug. 12, 2014, which is a non-provisional of U.S. Provisional Application for Remote Virtual Supervision System, U.S. Provisional Pat. App. No. 61/559,352, filed on Nov. 14, 2011, the specifications of which are incorporated herewith in their entirety by this reference.

BACKGROUND OF THE INVENTION

1. Field of the Invention

The present invention generally relates to a computer server, and more specifically, relates to a server that receives transmissions of GPS data, text message data, status data relating to community re-entry programs (job training, temporary housing, rehabilitation, drug testing, life coaching, and similar re-entry programs), social services data, school data, demographic data, time and date data, analyzes these data transmissions, and generates results according to the analysis.

2. Description of the Related Art

Each local government spends considerable money tracking and monitoring post release convicts living within the county after they are released from incarceration. After a convict is approved for release from incarceration, he may be subject to parole, probation, or some form of post-release supervision. Usually, the parolee/probationer ("P/P") must register with a local authority and he is assigned a case officer with whom he must check in periodically. A case officer is usually charged with one hundred or more P/Ps and he must make time to monitor and track each P/P. The P/P must physically report to the case officer personally on a periodic basis.

Each local government must provide enough case officers for a given population of P/Ps to handle in person meetings with the P/Ps, whether in office or in the field. Most of the time, these reporting meetings are routine and no issues result from these meetings. Even though these meetings are routine and without any important issue to be resolved, the P/Ps still need to report every month (or whatever the required frequency is mandated). This in person reporting system is an obstacle for P/Ps who has jobs or has no access to transportation. The P/P must take time off work and arrange for travel to the case officer's office for a short appointment. The case officer, on the other hand, must make himself available under his supervision; if either the case officer or the P/P is running late, it puts the rest of the case officer's appointments behind schedule, forcing appointments to be rescheduled. However, with jail overcrowding become a drain on states and counties, the case officer's P/P caseload has been growing dramatically without a corresponding growth in resources to help manage this larger case load. Case officers now have to determine which P/Ps are at greatest risk of recidivism requiring immediate intervention and which P/Ps are a lesser risk and to leave them alone. Case officers do not want to waste their time with well-behaved P/Ps when there are at risk P/Ps that require close monitoring and intervention to prevent recidivism. The challenge for case officers is determining and prioritizing which P/Ps are at greatest risk of recidivism requiring the most of amount of intervention.

Further, the P/P population throughout the country is increasing because of the trend away from incarceration of non-violent, non-dangerous offenders towards community correction solutions such that agencies managing P/P populations are now charged with managing a new population of offenders; this community corrections approach is broadly described as "post release community supervision" which include both the P/P population and this new group of offenders. Henceforth, "P/P" as used herein includes both probationers/parolees and the post-release community supervised offenders, collectively. At this larger scale, a lot of time and resources are wasted by case officers personally meeting with low risk P/Ps or responding to an incident where his P/P already committed a crime (recidivate) instead of intervening to help those P/Ps at greatest risk of recidivism. Preventing recidivism saves municipal money and resources by avoiding costs related arrest, incarceration and prosecution. Further, the setting described above follows a reactive model, i.e., the case officer monitors a P/P and reacts to what the P/P does or does not do. The case officer does not have information to anticipate possible what may happen to the P/P, thus the case officer cannot act more proactively to guide the P/P to become a productive member of the society.

Therefore, there is a need for a proactive monitoring, supervision and management system that is based on a "recidivism prevention model" which enables case officers and agency administrators to handle and manage a larger case load by anticipating which P/Ps are at greatest risk to recidivate and it is this system that the present invention is primarily directed to.

SUMMARY OF THE INVENTION

In one embodiment, there is provided a configurable apparatus, for monitoring a set of group behaviors and generating an indicator. The configurable apparatus comprises a data communication controller and an analyzer. The data communication controller receives from a plurality of information sources, through a telecommunication network, a plurality of social behaviors and from a requesting agency, a set of monitoring criteria. The analyzer assigns weights for each social behavior according to the set of monitoring criteria, analyzes a set of social behaviors according to the set of monitoring criteria, calculates a total score for the set of monitoring criteria for the requesting agency, compares the total score against the set of monitoring criteria, and generates an indicator if the total score matches a criterion in the set of monitoring criteria.

In another embodiment, there is provided a method for monitoring a set of social behaviors and providing an indicator. The method comprises receiving from a plurality of information sources, through a telecommunication network, a plurality of social behaviors, receiving, from a requesting agency, a set of monitoring criteria, assigning weights for each social behavior according to the set of monitoring criteria, analyzing, by an analyzer, a set of social behaviors according to the set of monitoring criteria, calculating a total score for the set of monitoring criteria for the requesting agency, comparing the total score against the set of monitoring criteria, and generating an indicator if the total score matches a criterion in the set of monitoring criteria.

In yet another embodiment, there is provided a method, for reducing recidivism of a P/P by generating and prioritizing the risk factors giving rise to recidivism. The method is executed by a supervision server and comprises receiving from a plurality of information sources, through a telecommunication network, a plurality of pertaining to the P/P, receiving, from a monitoring agency, a set of monitoring criteria, the set of monitoring criteria including individual factors, environment factors, and school factors, assigning weights for each factor according to the set of monitoring criteria that projects the probability of recidivism, calculated, by an analyzer, a total score for the set of monitoring criteria for the requesting agency, and generating a visiting schedule according to the total score in order to meet the P/Ps most likely to recidivate first.

In yet another embodiment, there is provided a non-transitory computer readable medium on which is stored a computer program for remote monitoring a P/P by the case officer. The computer program comprises computer instructions that when executed by a computing device performs the steps for receiving from a plurality of information sources, through a telecommunication network, a plurality of social behaviors, receiving, from a requesting agency, a set of monitoring criteria, assigning weights for each social behavior according to the set of monitoring criteria, analyzing, by an analyzer, a set of social behaviors according to the set of monitoring criteria, calculating a total score for the set of monitoring criteria for the requesting agency, comparing the total score against the set of monitoring criteria, and generating an indicator if the total score matches a criterion in the set of monitoring criteria.

The present system and methods are therefore advantageous as they enable monitoring of a P/P's social interactivity and behavior changes over time to generate advance warning indicators of conditions most likely to lead to recidivism and then alert the monitoring agencies. Other advantages and features of the present invention will become apparent after review of the hereinafter set forth Brief Description of the Drawings, Detailed Description of the Invention, and the Claims.

BRIEF DESCRIPTION OF THE DRAWINGS

Features and advantages of embodiments of the invention will become apparent as the following detailed description proceeds, and upon reference to the drawings, where like numerals depict like elements, and in which.

DETAIL DESCRIPTION OF THE INVENTION

In the following description, the term "exemplary" is meant only as an example, and does not indicate any preference for the embodiment or elements described. Further, like numerals refer to like elements throughout the several views, and the articles "a" and "the" includes plural references, unless otherwise specified in the description. The terms "parole officer" and "case officer" are used interchangeably, so are "P/P" and "probationer." The "reporting" and "checking in" are also used interchangeably.

In an overview, the present invention provides a remote virtual supervision system that enables a case officer to monitor P/Ps and to spend more time with those P/Ps who may be prone to lapse back criminal activity (recidivism). The P/P can "check" in through the remote device by recording a video, audio file, text message, or GPS data transmission on the remote device and the remote device then transmits the recorded GPS, text message, time/date stamp, video or audio file via wireless telecommunications network to a remote supervision server. The remote supervision system will analyze the GPS, text, time/date, audio and video files and then save the analysis result for viewing by a case officer. The remote supervision system will issue alerts if abnormalities are detected through the analysis. The remote supervision system will also use the "check-in" information from each P/P and other environmental information for each P/P, such as job and housing, to perform a risk and need assessment for every P/P. Those P/Ps who are deemed to be in the high risk group will be visited by the case officer more often.

Figure 1:
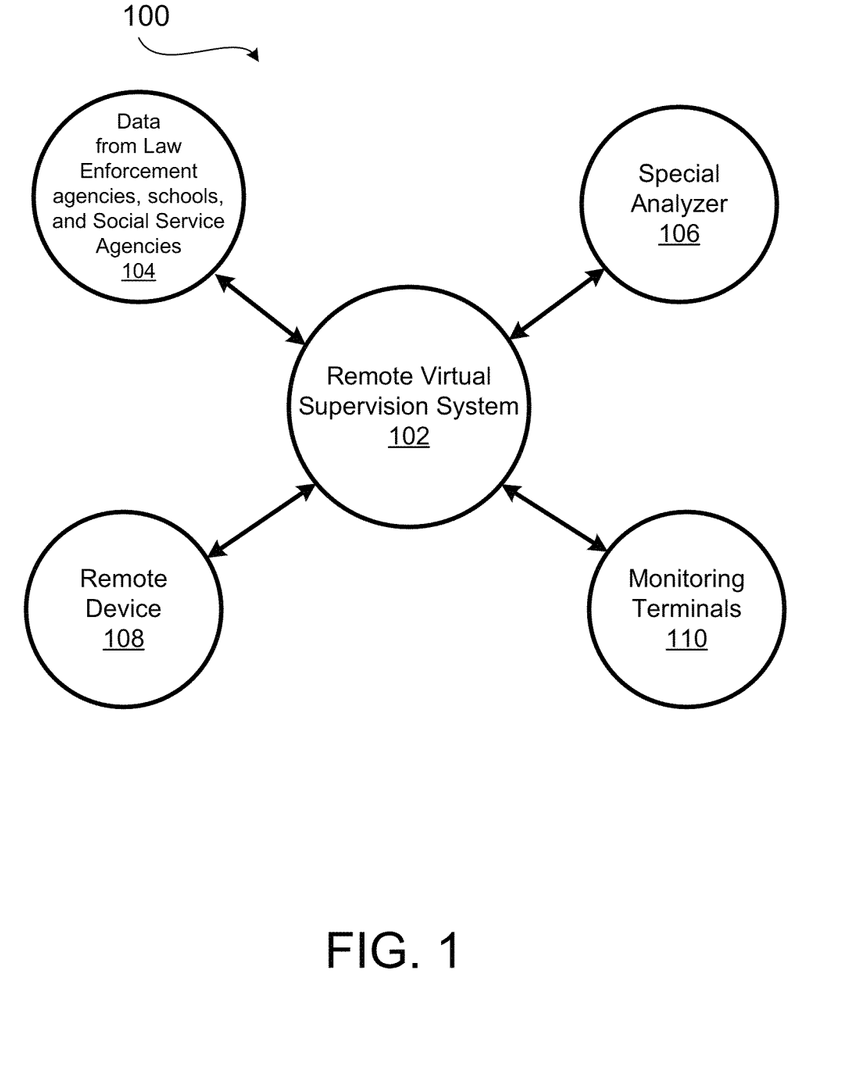
FIG. 1 depicts the relationship between a remote supervising system and other components.

FIG. 1 depicts the relationship 100 between a remote supervision system 102 and other components. The remote supervision system 102 receives check-in information from remote devices 108 and the check-in information, which includes audio and video files and the location (GPS) information on the remote devices 108, is analyzed and made available to case officers who access the analysis result using monitoring terminals 110. The monitoring terminals 110 may be connected to the remote supervision system 102 directly or remotely. The remote supervision system 102 may receive information from law enforcement agencies, schools, and social service agencies 104 and may also make the analysis results available to the law enforcement and social services agencies 104. The remote supervision system 102 may also make the analysis results to a special analyzer 106 that will use the analysis results to help local governments to manage, predict, and reduce criminal activities.

The purpose of the remote supervision system 102 is not only to use information received from the remote device 108 and the law enforcement and social services agencies to generate data for the case officers to track and to monitor the P/Ps, but also to assess risk of recidivism and the need for each P/P. The purpose of the assessment of risk and need for each P/P is to reduce the recidivism rate. The likelihood of recidivism can be predicted using the following function:

Recidivism=$F$(housing, education, job, sobriety/drug use);

where, housing reflects on P/P's housing condition, who are house mates for the P/P, job reflects on whether P/P has a steady job, education reflects P/P's attendance in training programs, employable skills, and interest in changing behavior, and sobriety/drug use reflects whether P/P is suspected of violating sobriety/drug use conditions of release.

The information from the law enforcement agencies, schools and social services agencies may include the housing information, the sobriety/drug use information, and the job information for the P/P. If the housing information indicates that the P/P is sharing a room with people other than his family, sharing living space with people other than the family members may be prejudicial to the P/P who is trying to return to a normal life because house mates who are not family members may exert undesirable influence on the P/P. If the information from the social services agency indicates that the P/P has a steady job, this is a positive factor and will increase the likelihood of the P/P to return to a normal life and be accepted by the society. The sobriety/drug use information may be received from the law enforcement agencies or derived from the information received from the remote device 108. Information from schools indicates the P/P's positive attendance and performance in class reflects his attitude and intention to improve his behavior.

If the analysis of these four factors indicates that the P/P has higher risk of recidivism, then the remote monitoring system 102 may schedule more case officer visits to this P/P. For P/Ps who have lower risk of recidivism, the remote monitoring system 102 schedules fewer case officer visits. The remote monitoring system 102 will also generate a visiting schedule for each case officer and the visits to each P/P monitored by the case officer. The visits to each P/P are scheduled randomly by the remote monitoring system 102 according to the result of the assessment of risk and needs. The visits are randomized using a gaming theory and an anchored bias to maximize the effect of these visits.

Besides generating a visiting schedule for a case officer, the remote monitoring system 102 is also capable of generating a route for the scheduled visits that decreases the likelihood of criminal behavior. Using the P/P's personal information, such as his address or wok location, and traffic information from other online resources, the remote monitoring system 102 can generate a route for the case office to take and the remote monitoring system 102 will be able to schedule the visit for each P/P by taking in consideration the distance between each visit, the projected traffic condition for that route, and the frequency of each visit in order to optimize officer effectiveness. The scheduling of officer visits with P/P is important in keeping the P/P population under control given the limited number of officers available. Optimizing how frequently an officer meets with a P/P based on risk of recidivism fully leverages the effectiveness of a small officer force relative to the P/P population.

Figure 2:
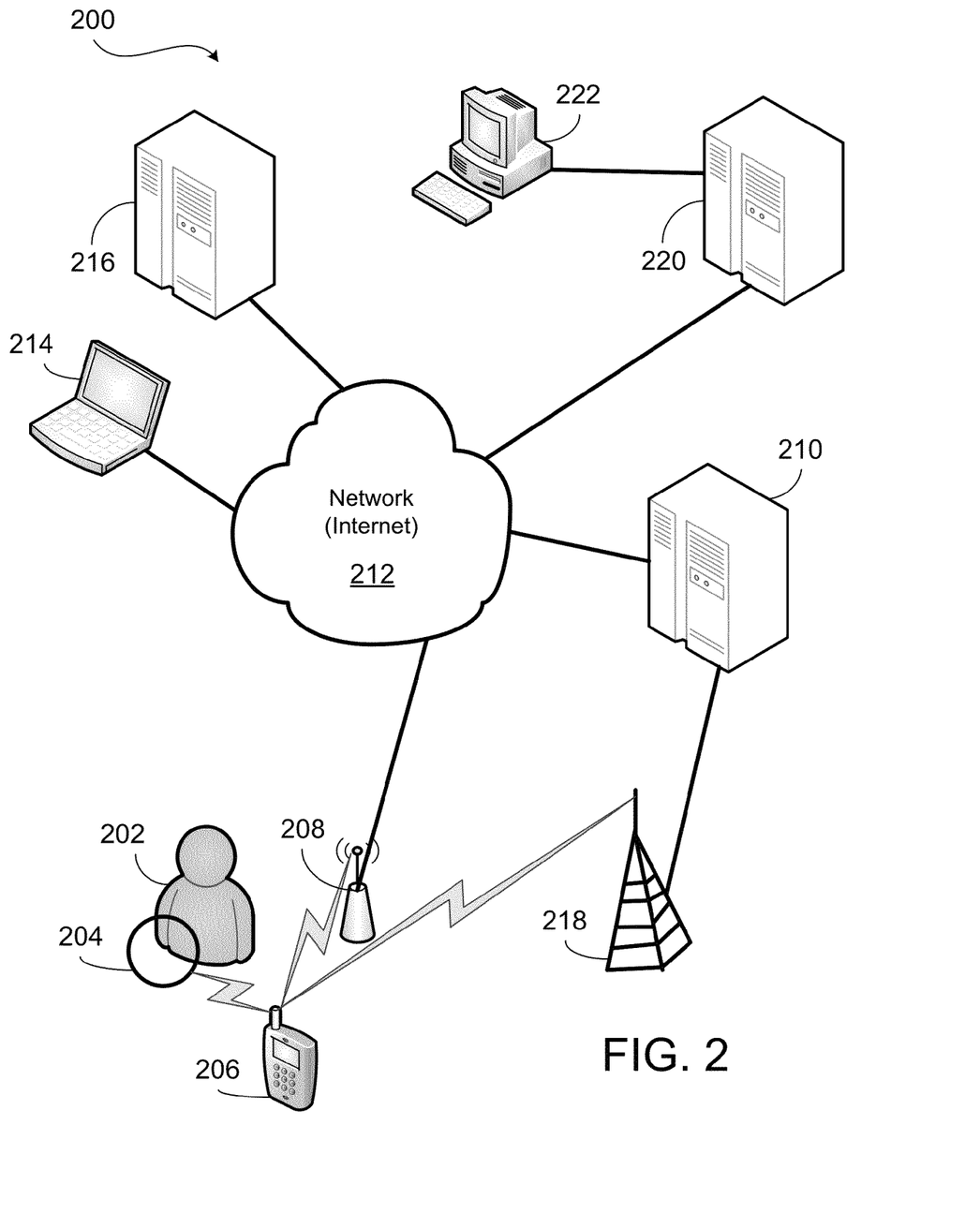
FIG. 2 depicts a system architecture of the remote supervision system according to the invention.

FIG. 2 depicts system architecture of the remote supervision system according to the invention. A P/P 202 may be fitted with a software application ("App") enabled on the P/P's smart phone device 206 that he carries on his body at all times. This App enabled smart phone device 206 periodically communicates with a cell tower 218, which is connected to a base station (not shown). The base station is connected to a mobile switching center (MSC) 210. The mobile switching center 210 is connected to a data communication network (the Internet) 212. A remote server 220, on which the remote monitoring system 102 is executed, that collects information from the remote device 206 is also connected to the Internet 212. The information collected can be accessed through a terminal 222 by a case officer. Optionally, the case officer can also access the information using a mobile computing device (such as a tablet or laptop computer) 214 anywhere through the Internet 212.

A P/P 202 can check in with his case officer by making a GPS data/time-date data/text/audio/video transmission and sending this transmission to the remote supervision server 220. The transmission data will be analyzed by the remote server 220 and the analysis result is stored in the remote supervision server 220 and made available to case officers. The case officers can access the analysis result at their office using attached terminals 222 or remotely through handheld tablet computers 214 in the field. The remote supervision server 220 can also send the analysis results to a server 216 at law enforcement agency or social services agency or receive information from this server 216.

The remote supervision server 220 (remote monitoring system 102) will communicate with the case officer who is out on the field visiting P/Ps 202. The case officer may be carrying a laptop computer 214, a tablet computer, or a smart mobile telephone. The remote supervision server 220 will send the latest updates about the P/Ps that the case officer is monitoring. The remote supervision server 220 will suggest a prioritized list of which P/Ps to visit first for the case officer's visiting schedule according to the latest updates about the P/Ps.

Figure 3:
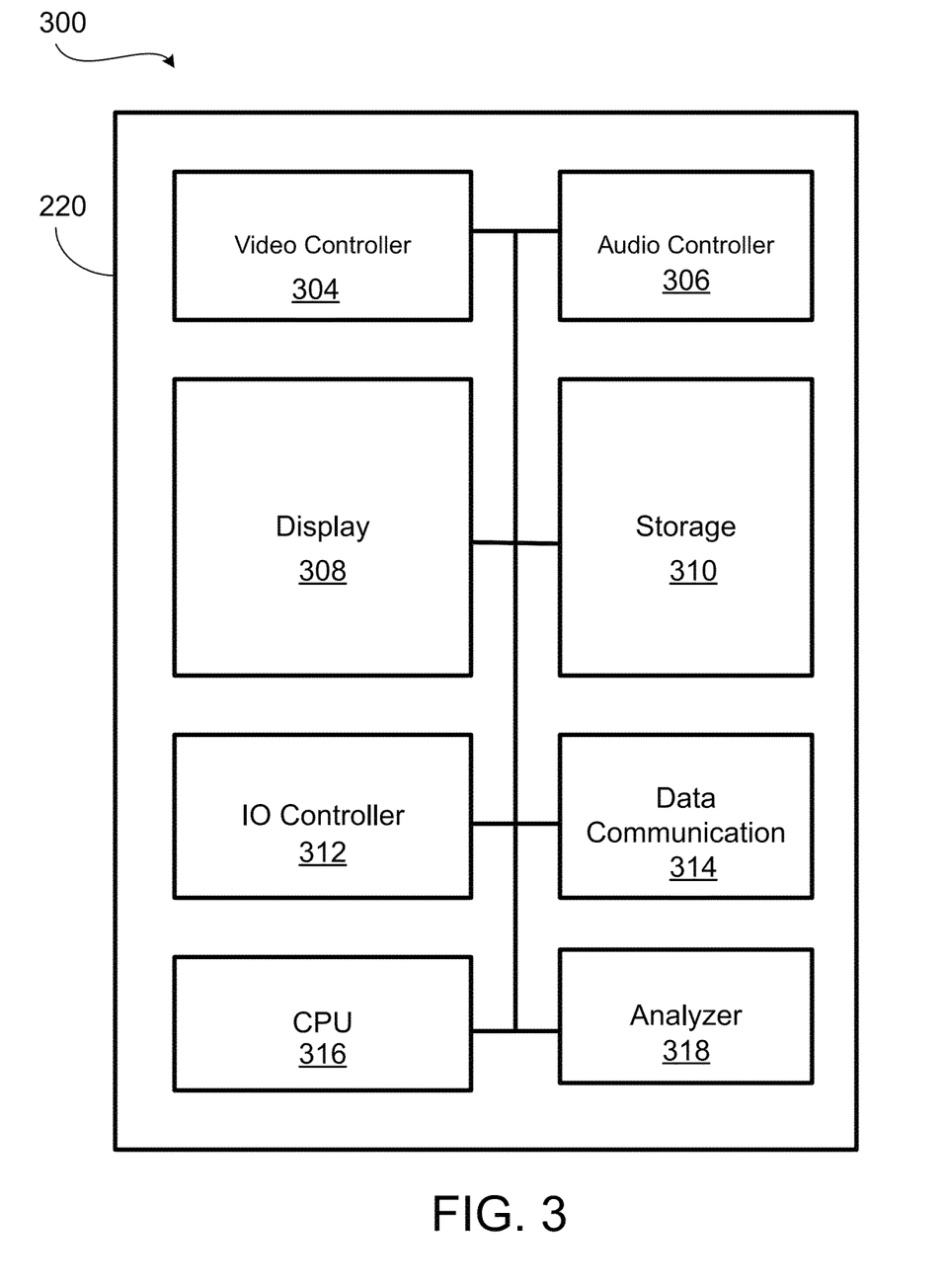
FIG. 3 illustrates architecture of a supervision server for the P/P supervision system.

FIG. 3 is a logic block diagram 300 for a remote supervision server 220. The remote server 220 has a video controller 304 for controlling a video display, an audio controller 306 for controlling audio, a display screen 308, an input/output (IO) controller 312 for controlling user interface, a data communication controller 314 for transmitting and receiving data, analyzer 318 for analyzing video/audio data received from the remote device 206, a central processing unit (CPU) 316, and a storage unit 310. The video controller 304 controls the display of video received from the remote device 206 and the video camera, so a case officer can set up a live chat with a P/P 202. The audio controller 306 controls the display of audio messages. The display screen 308 displays GPS data/time-date data/text/audio/video received from the P/P 202. The IO controller 312 controls the operation of the display screen 308 and data input and output operations. The data communication controller 314 enables the remote server 220 to send and receive data to and from a remote device 206 and also to communicate with a plurality of law enforcement/social services agency server 216. The storage unit 310 is a non-transitory, computer readable storage device and used for storing instructions, GPS data/time-date data/text/audio/video files, and information received from external sources, such as the law enforcement/social services agencies. The CPU 316 controls the operation of the remote supervision server 220 by executing instructions stored in the storage unit 310. The CPU 316 can coordinate operations needed to set up a live chat between the P/P 202 and the case officer. The remote supervision server 220 may also handle the GPS information received from the remote device 206. It is understood that each logic block in FIG. 3 may be implemented by hardware, software, or combination thereof.

The data communication center 314 can receive P/P "risk-needs" data including biographic background data and near real time status data relating to the P/P's participation in community re-entry programs (job training, education, temporary housing, rehabilitation, drug testing, life coaching, and similar re-entry programs) from various third party sources (GPS tracking service, schools, community assistance agencies, etc.). The analyzer 318 can analyze the risk-needs and report data against a set of standard behavior indicators and a set of P/P past behavior indicators. The central control unit 316 manages and prioritizes the activities of the case officers to address those P/Ps at most risk of recidivism if suspicious activities were detected by the analyzer 318. The analysis result is then transmitted to a mobile management device that each case officer carries with him to help him manage his schedule of meetings with P/Ps based on the risk assessment of each case officer's P/P case load.

Figure 4:
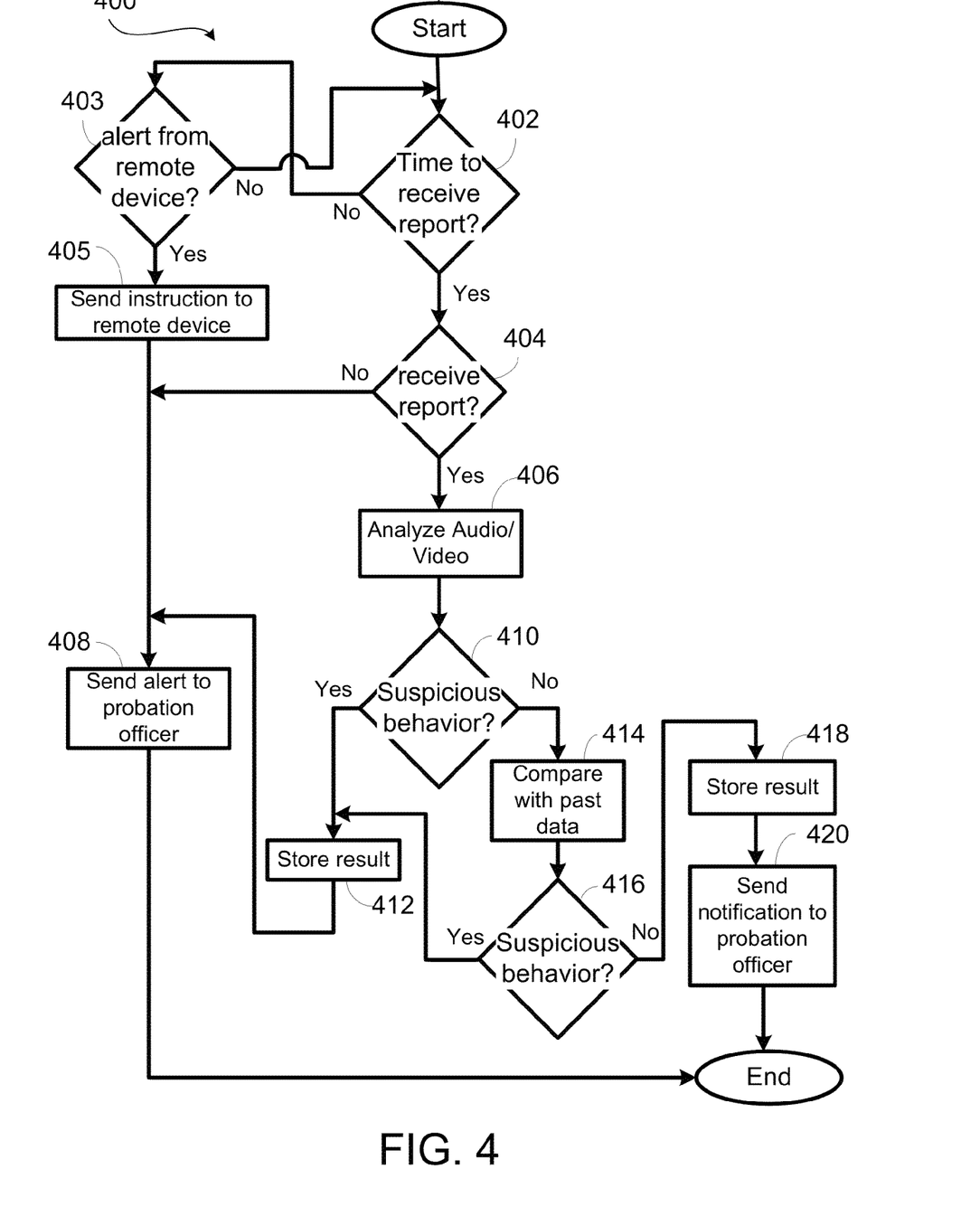
FIG. 4 illustrates a process for a remote monitoring using the present invention.

The remote supervision server 220 allows a P/P to report to his case officer remotely and not in real time. FIG. 4 illustrates a process 400 for the remote supervision server 220. The remote server 220 receives information about P/Ps 202 from other law enforcement agency, such as court or penitentiary system and uses this information to track convicts who have been released on parole. The remote supervision system 220 checks whether it is time to receive information or report from a P/P, step 402, i.e., whether it is time for a P/P 202 to send an audio and video file to the remote supervision system 220. If it is time to receive the reporting information from the P/P 202, the remote supervision system 220 checks whether the report has been received, step 404. If the report has not been received from the P/P 202, the remote supervision server 220 will send an alert to the case officer, step 408, assigned to track this P/P 202. The alert is a message with high level of urgency and can be sent as an email, a text message (SMS) to the case officer's mobile phone, or a telephone call to the case officer.

If the P/P 202 has checked-in remotely by sending a GPS data/time-date data/text/audio/video file, the remote supervision server 220 analyzes the GPS data, text, audio and video files, step 406. The remote supervision server 220 is equipped with an analyzer 318 with a facial recognition program, a voice recognition program, and may also be equipped with a retina scanning program. The analyzer 318 will use these programs to obtain indications of probationer's physical and psychological conditions by first checking against certain standard behavior indicators and then checking against the probationer's own past behavior. The standard behavior indicators may include, for example, a red retina may be an indication of sobriety/drug use, lack of direct eye contact into the camera may be an indication of hiding some information, and blurb speech may be an indication of drunkenness. The remote supervision server 220 uses these specialized programs to check for suspicious behavior, step 410. If a suspicious behavior is detected, the analysis result is stored, step 412, and an alert is sent to the case officer, step 408. The case officer can check the analysis result later and then take appropriate action.

If no suspicious behavior was detected after checking the analyzed result against the standard behavior indicators, the analyzed result is checked against the probationer's own past behavior indicators, step 414. If a probationer acts "normal" but different from his past behavior, this different behavior may also be a concern and to be investigated. If a suspicious behavior is detected, the analysis result will be stored, step 412, for further analysis by the case officer. An alert will be sent to the case officer, step 408. If no suspicious behavior is detected, the analysis result is saved for future use, step 418, and a notification is sent to the case officer, step 420. The notification is a message with low or normal level of urgency. The probationer officer can then review the audio/video file from the P/P 202 and the analysis result at later time.

Besides checking whether it is the time to receive a report from P/Ps 202, the remote supervision server 220 also checks whether there is any alert from the remote device 206. The remote device 206 will automatically send alerts to the remote supervision server 220 if some unusual conditions happen. The unusual conditions may be related to the hardware of the remote device 206 and may also be caused by the P/P's action. If an alert is received from the remote device 206, the remote supervision server 220 will first send an instruction to the remote device 206, step 405, then send an alert to the case officer, step 408. The instruction sent by the remote supervision server 220 to the remote device 206 may be an instruction for self-diagnostic. If the alert is caused by the P/P 202 action, then instruction sent by the remote supervision server 220 may instruct the remote device 220 to record video/audio without the P/P 202 being aware of.

Figure 5:
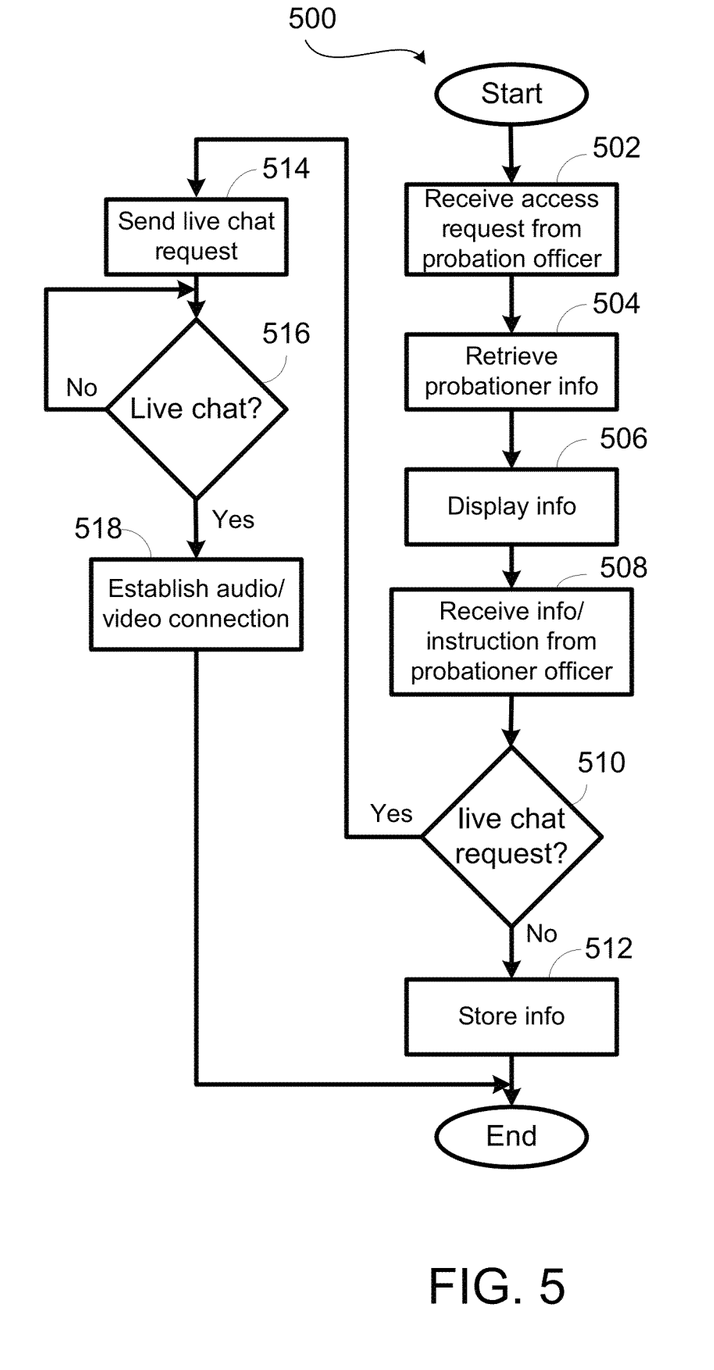
FIG. 5 depicts an interface process between the remote supervision server and a remote probationer officer.

FIG. 5 depicts an interface process between the remote supervision server 220 and a remote probationer officer. After sending an alert or a notification to the case officer, the remote supervision server 220 may receive an access request from the case officer, step 502. The access request may be related to a particular P/P 202. The remote supervision server 220 retrieves the P/P's information, step 504, and displays the information on the display device 308, step 506, if the case officer is in the office. If the case officer is accessing the information remotely, the retrieved information will be sent to the remote terminal (laptop computer) 214 for display. The remote supervision server 220 may receive instruction from the case officer, step 508. The remote supervision server 220 checks if the instruction is for a live chat, step 510. The case officer can use the live chat to check on the P/P 202 and to understand if there is any difficulty or issue that the P/P 202 is facing. If the instruction is not for a live chat request, the remote supervision server 220 will act accordingly and store the information, step 512.

If the instruction is for a live chat request, the remote supervision server 220 send a live chat request to the remote device 206, step 514. The live chat may be for an immediate live chat and may also be scheduled for a later time. The remote supervision server 220 will check if it is time for the live chat, step 516. If it is the time for a live chat, the remote supervision server 220 will establish an audio/video connection between the remote supervision server 220 and the remote device 206.

Figure 6:
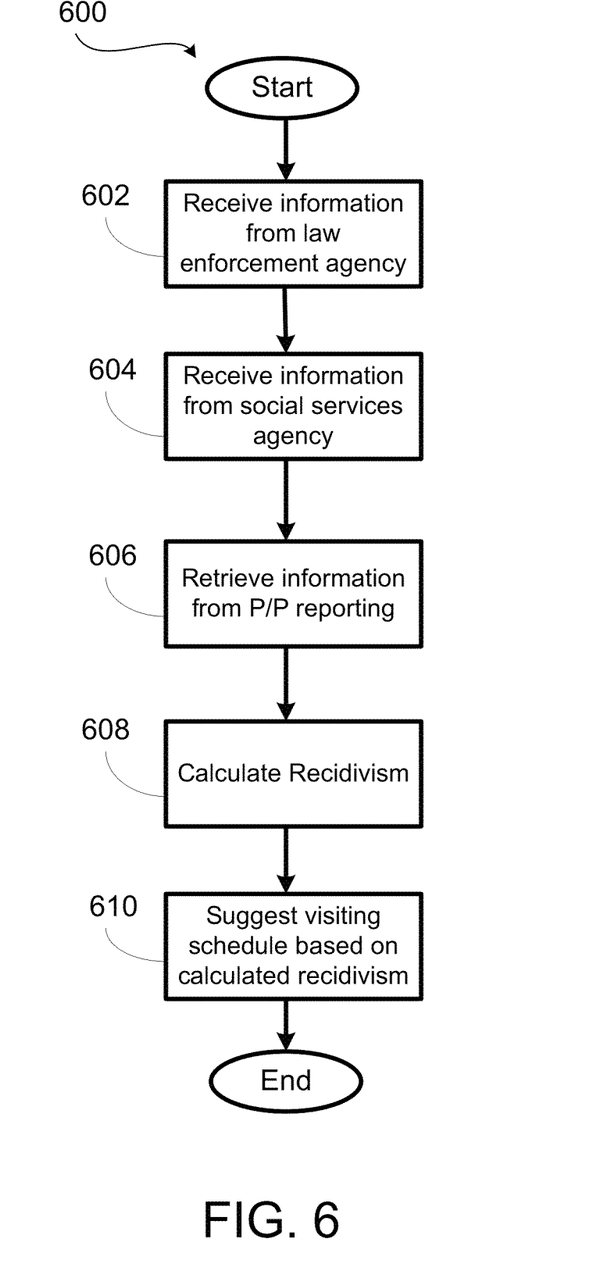
FIG. 6 illustrates a process for calculating the likelihood of recidivism.

FIG. 6 illustrates a process for the remote supervision system 102 to calculate recidivism. The remote supervision system 102 receives information from law enforcement agency, step 602, schools, and social services agency, step 604. The remote supervision system 102 also uses information retrieved from audio and video reporting done by P/P, step 606. The remote supervision system 102 calculates the possibility of recidivism by considering these factors, step 608, and generates a visiting schedule based on the calculation result, step 610, as described above.

When in use, the remote supervision server 220 of the present invention enables parole officer to monitor P/Ps 202 assigned to him remotely and at his convenience. For instance, a convict may be granted probation after serving time in a regular prison and one condition for the probation is for the convict to report regularly to a case officer. The case officer may be assigned to many P/Ps and each P/P may have a different reporting time. On the day for reporting, the P/P 202 can use the remote device 206 to record a short video. The video recording may consists the P/P providing his recent information, such as his current address, whether employed or not, and any other information that may be required by the case officer. The video is stored on the remote device 206 and the remote device 206 will transmit the video file along with other pertinent information, such as time and location of recording, to a remote supervision server 220. The remote supervision server 220 will analyze the GPS data/time-date data/text/audio/video files and make the analysis result available to the case officer. If a suspect behavior is detected during the analysis, the remote supervision server 220 will send an alert with pertinent information to the case officer.

If the P/P 202 is in an area known for high crime activities, the remote device 206 may send an alert to the remote supervision server 220 and the remote supervision server 220 may instruct the remote device 206 to display a message to the P/P 202 advising him to leave the area. The remote supervision server 220 may also instruct the remote device 206 to record GPS data/audio/video silently and later send the data back to the remote supervision server 220 for analysis.

The transmission of the video file or any alert or warning to the remote supervision server 220 is done through wireless transmission via a telecommunication network and it can also be done through Wi-Fi connections. When the video file is transferred to the remote server via the wireless communications network, the transmission of the video file is through a data channel and there is no need for a voice channel. The transmission of the video file is done automatically by the remote device without knowledge by the P/P. The transmission can be done in real time after the video is recorded or in batch mode, i.e., scheduled for a time when there is less network traffic.

The remote supervision server 220 will also allow a case officer proactively monitor P/Ps assigned to him. The remote supervision server 220 will calculate the likelihood of recidivism for each P/P using the information from the reporting done by the P/Ps and the personal information from other law enforcement or social services agencies. The personal information includes housing information, job information, and sobriety/drug use information. The remote supervision server 220 will generate a report on the likelihood of recidivism. For those P/Ps with high possibility of recidivism, the remote supervision server 220 will flag these P/Ps as needing attention from the case officer. The remote supervision server 220 will also generate a visiting schedule and also a visiting route for the case officer.

Each agency can have a criteria list that will be used to process all the information received by the supervision server 220. For example, for a P/P monitoring office, the criteria list may contain factors related to P/P's work, school, and social circle. Each factor will be evaluated against the information collected from all social services and government agencies. When the result of the evaluation of all the factors indicate a certain result or trend, the P/P monitoring office will be notified and a recommended visiting schedule will be generated.

Figures 7, 8:
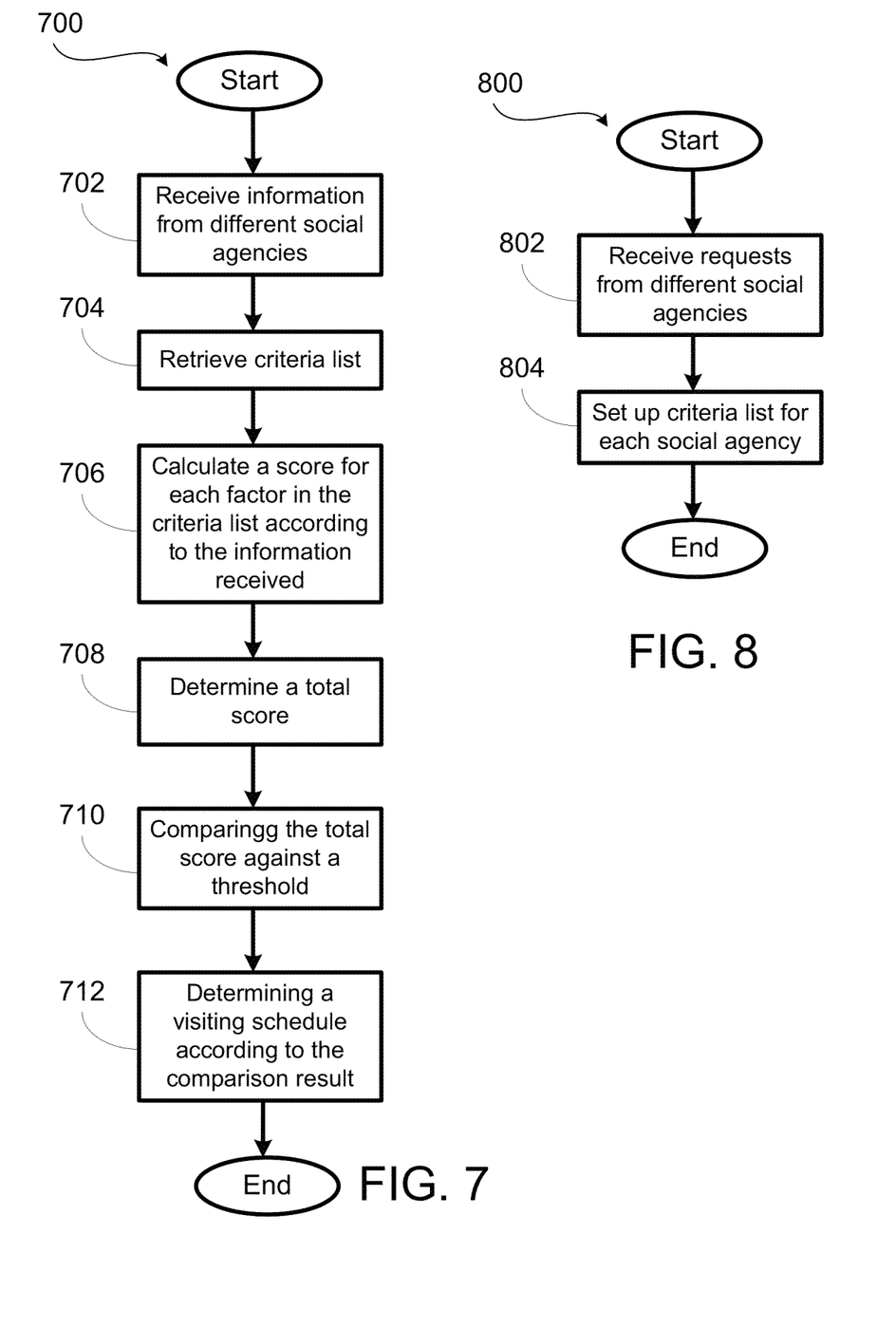
FIG. 7 illustrates yet another process for calculating the likelihood of recidivism.
FIG. 8 illustrates a process for automatically interfacing with different social agencies.

FIG. 7 illustrates another embodiment of the present invention, in which the recidivism is used in the determination a visiting schedule for a particular purpose. The flowchart 700 illustrates a supervision server 220 receiving information from different social service or government agencies, step 702. The supervision server may receive information from agencies described in block 194 of FIG. 1 and also from other government agencies. The information from each agency contains not only P/P information and other pertinent information about the neighborhood, but also a list of criteria for the information that agency is interested to know. Each agency can use the supervision server 220 to obtain the data that is of particular interest for them. The supervision server 220 retrieve criteria lists from the information received, step 704. Each factor in a criteria list is checked against the information received from the social services and government agencies and a score is calculated for each factor, step 706. A total score is determined for each criteria list, step 708. After the total score is calculated, the total score is compared against a threshold, step 710. This comparison result is used for determining a visiting schedule for a P/P, step 712, if the criteria list is from a P/P monitoring office.

The system of the present invention can support needs for different agencies. FIG. 8 is an illustration 800 of the system of the present invention interfacing with different agencies. The server 220 receives requests from different social services agencies, step 802, and sets up a criteria list for each social agency, step 804. These criteria lists are used for processing the information as described by FIG. 9.

Figure 9:
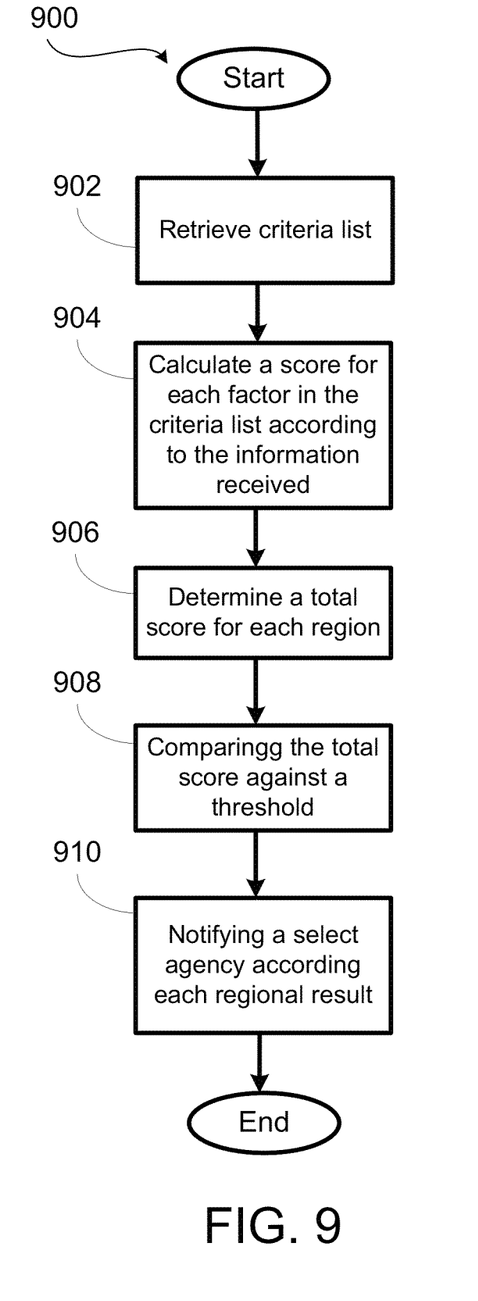
FIG. 9 illustrates a process for predicting the likelihood of social problems in a particular geographical area.

FIG. 9 illustrates a process 900 performed by the server 220 using the information received from different social services or government agencies. The server 220 retrieves criteria lists from a storage unit, step 902, and calculates a score for each factor in the criteria list using the information received, step 904. The criteria list received from each agency may target for a set of particular social characteristics of a neighborhood or geographical region, a common behavior trend for a people of a particular age group, or some environmental characteristics of a city or region. For example, a police department may be interested to know when the unemployment rate for a particular neighborhood reaches a particular mark and this may indicate that people may be more frustrated in that neighborhood and there may be more loitering in the neighborhood. Another example may be a school district is interested to know when the ethnic composition of a particular region reaches a point because the multi-language instruction may be justified at that time. Using these specific criteria, a total score is calculate for each region or each special group, step 906, and this total score is compared against a threshold, step 908. If the total score surpasses the threshold, a notification is sent to the agency associated with that total score, step 910. This notification is an advance warning to the agency based on the monitoring criteria established by the agency. This advance warning allows the agency to take proper steps in anticipation to different issues that may result from a set of particular social characteristics or behaviors observed. For the example of the police department, if the total score of the neighborhood for unemployment, underemployment, and the house vacancy rate surpasses the threshold, a notification is sent to that police department.

Figure 10:
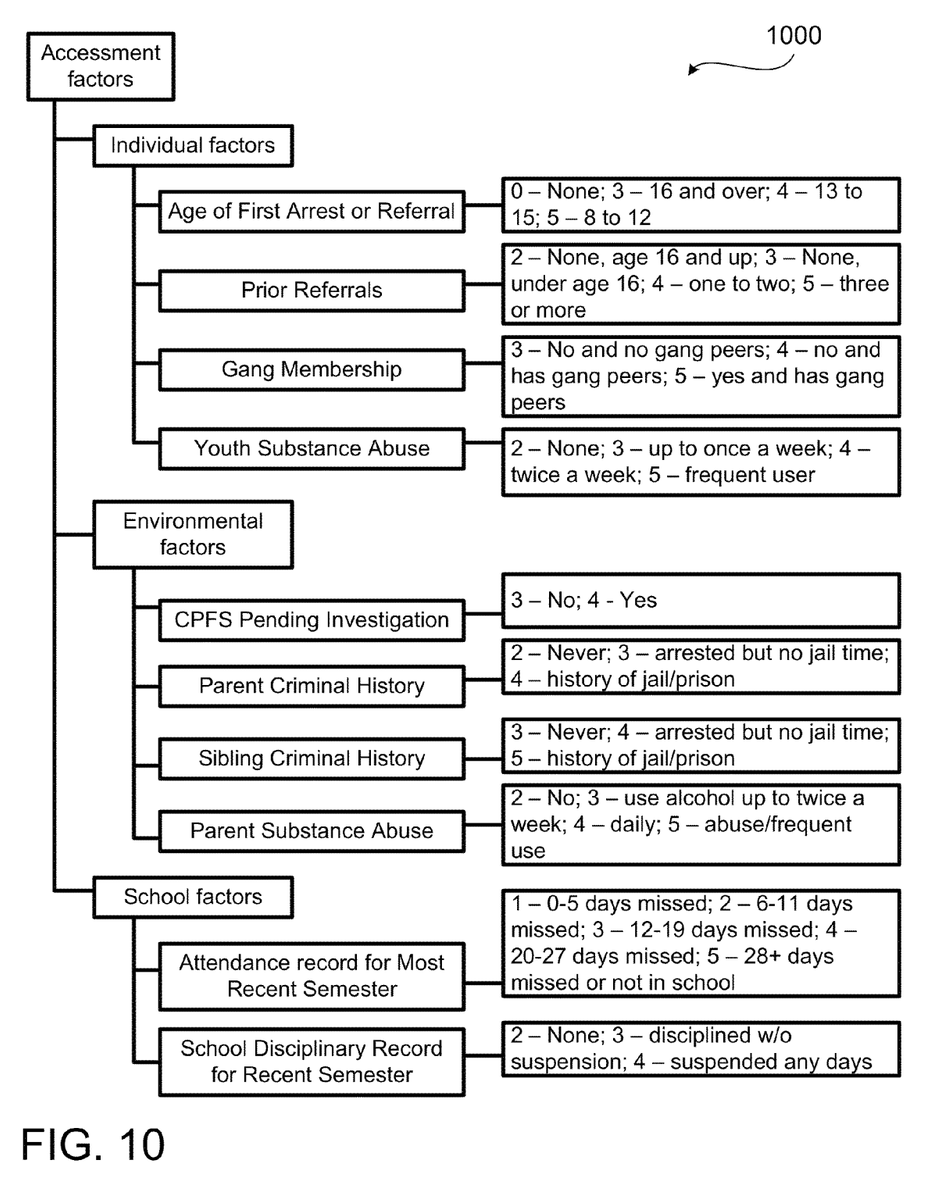
FIG. 10 illustrates a sample set of criteria for calculating the likelihood of recidivism.

FIG. 10 is a sample criteria 1000 for calculating recidivism for a juvenile offender. The recidivism may be accessed through analysis of different factors, factors that can be divided into three major groups: individual factors, environmental factors, and school factors. The individual factors include, but not limited to, age of the first arrest or referral to the social services agency, number of prior referrals or arrests, whether part of a gang, and whether subject has any substance abuse problem. Each factor is evaluated and a score given. The sample score is provided in FIG. 10. The environmental factors may include whether there is a pending investigation at the Children Protection and Family Service (CPFS) agency, whether parents have any criminal history, whether siblings have any criminal history, and whether parents have substance abuse problem. Each these environmental factors will impact the juvenile offender and a score is assigned to each answer. The school factors may include whether the youngster is attending the school and whether he was disciplined recently at the school. Again, each situation is assigned a different score.

Below is an example of application of the sample criteria 1000 to a juvenile offender. Let's assume that John was arrested for his first offense at age of 14, has been referred to the CPFS Agency after his first arrest, has friends who are gang members, has no history of drug use, has a case at the CPFS agency is pending, his father has been arrested for drunkenness but suffered no jail time, his siblings never had any problem with law enforcement agency, his father is frequently drunk, has missed 2 weeks of schools, and has been disciplined and suspended for one week. Based on his condition and record, the total score for John is calculated as follows:

1. arrested for his first offense at age of 14=4 points
2. has been referred to the CPFS Agency after his first arrest=4
3. has friends who are gang members=5
4. has no history of drug use=2
5. has a case at the CPFS agency is pending=5
6. his father has been arrested for drunkenness but suffered no jail time=4
7. his siblings never had any problem with law enforcement agency=3
8. his father is frequently drunk=5
9. has missed 2 weeks of schools=2
10. has been disciplined and suspended for one week=4

Based on the above conditions, the total score for John would be 38. If the ranking set up by the monitoring agency is:

| Score | Ranking | Probation Visit |
|---|---|---|
| Up to 29 | 1 (low risk) | 1 time per 2 months |
| 30-36 | 2 (moderate risk) | 2 times per month |
| 37-42 | 3 (high risk) | 4 times per week |
| 43 and up | 4 (high risk) | 6 times per week |

John would be considered to be a juvenile in the high risk category and a close monitoring of 4 times a week would be recommended. Other mitigating factors may be applied to each case. For the above example for John, scoring may be mitigated if John is employed or if he is a minor living with his natural parents. The mitigating criteria may be developed by considering other factors.

The exemplary criteria of FIG. 10 and the ranking of the previous paragraph can be easily adapted to other situations and purposes, such as monitoring changes in a neighborhood or a school district as described in FIG. 9. The server 220 of the present invention not only receives information from a plurality of agencies and monitors changes in an individual or a neighborhood, but also can be configured to generate recommendations for different agencies based on different criteria for each agency. The same factor may have different weight when used by different agencies, i.e., the weight assigned to each factor is configurable according to the destination agency and to the monitoring purpose. For example, a juvenile of 17 years old not attending the school may be 5 for a parole monitoring agency but may weigh only 2 for a law enforcement agency since it is more common for police officers to see juvenile of 17 years old not attending any school. The same factor when used by the law enforcement agency for a different purpose may have yet another weight. For example, if the law enforcement agency is concerned about drug consumption by underage youngsters, then a juvenile of 17 years old not attending school may weigh 4 since it is more likely there is some reason behind that juvenile not attending the school. Additionally, a factor may have different weights when used by a single agency for different purposes, i.e., the weight for a factor is assigned according to the set of criteria received from an agency and not according to the identity of the agency. Consequently, a requesting may send simultaneously multiple sets of criteria, each set of criteria require a different weight to be assigned to each factor, and different indicators will result for each set of criteria.

Figure 11:
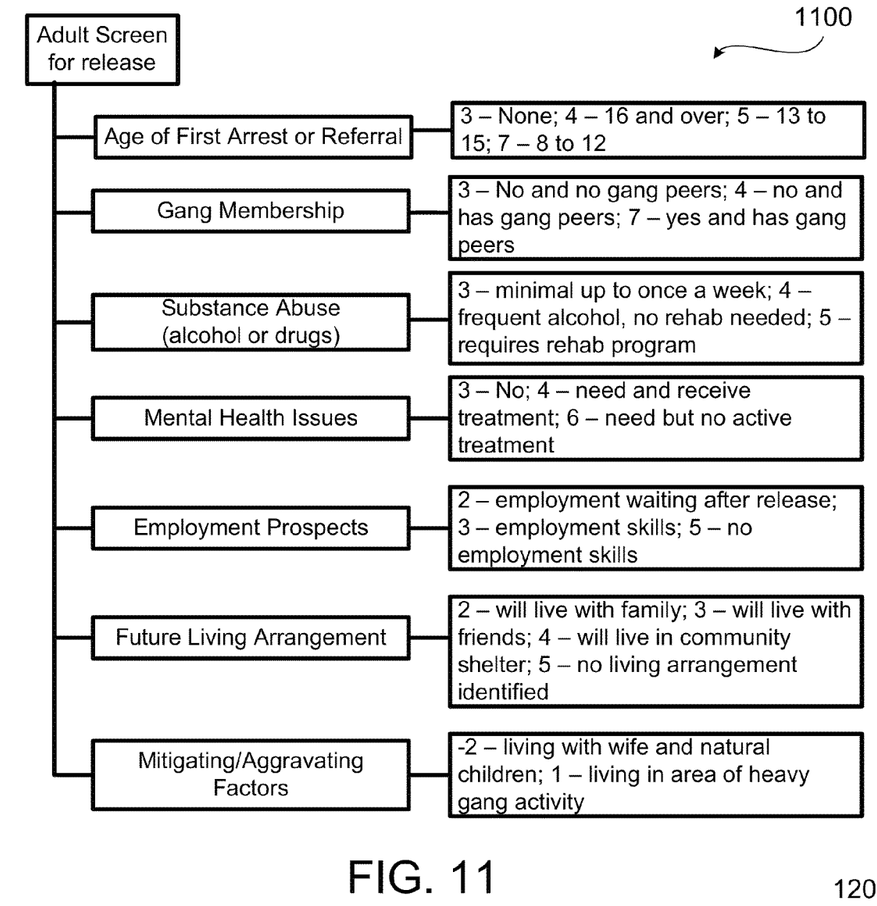
FIG. 11 illustrates a sample set of criteria for screening adult detainees for release.
Figure 12:
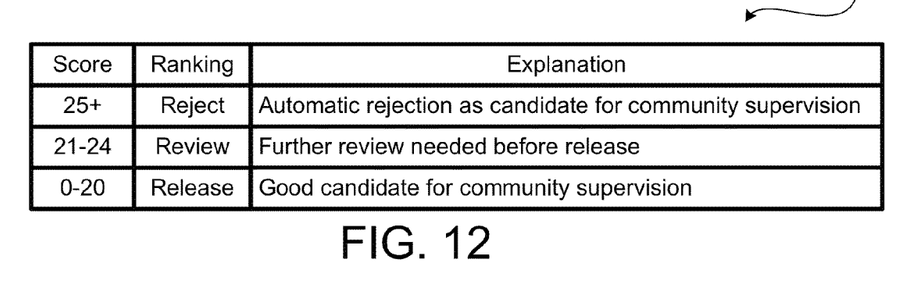
FIG. 12 illustrates a ranking criterion for determining whether adult detainees can be released for a community supervision program.

FIG. 11 illustrates a set of assessment criteria 1100 for screening adult detainees for release. The assessment criteria 1100 are similar to the criteria 1000 of FIG. 10 with one difference. In the assessment criteria 1100, it is included consideration of mitigating and/or aggravating factors. For example, if the detainee will live with wife and his natural children upon release, then his total score calculated from the assessment criteria 1100 is subtracted by 2. On the other hand, if the detainee will live in an area of heavy gang activity, then his total score will be increased by 1. After the total score is calculated taking in consideration the mitigating/aggravating factors, the total score is compared with a predetermined scale 1200 shown in FIG. 12. Depending on how the total score of a detainee is ranked, a panel can determine whether to release the detainee under a community supervision program.

Before assessing the detainee in detail, it is recommended to check certain red flags that prevent release of the detainee under the community supervision program. Below is a sample set of red flags:

| Significant Disciplinary Record while in detention | Active Restraining Order | Outstanding Warrants | Any assault & battery with deadly weapon | Criminal history of repeat violence |
|---|---|---|---|---|
| Yes | Yes | Yes | Yes | Yes |
| No | No | No | No | No |

Any yes to these red flags will warrant automatic rejection to the release of the detainee to the community supervision program and there is no need to evaluate the detainee under the criteria 1100 shown in FIG. 11.

Figure 13:
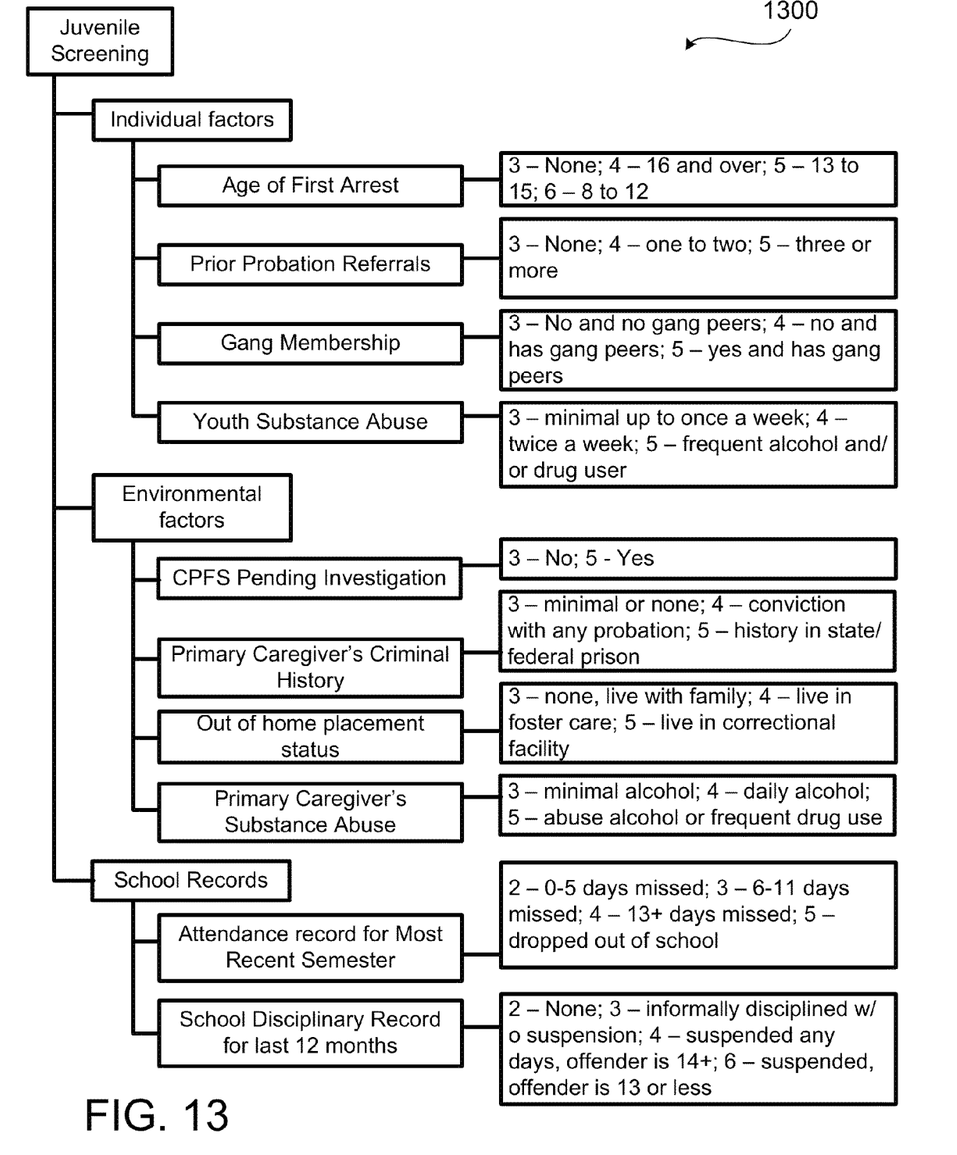
FIG. 13 illustrates a sample set of criteria for screening juvenile offenders.
Figure 14:
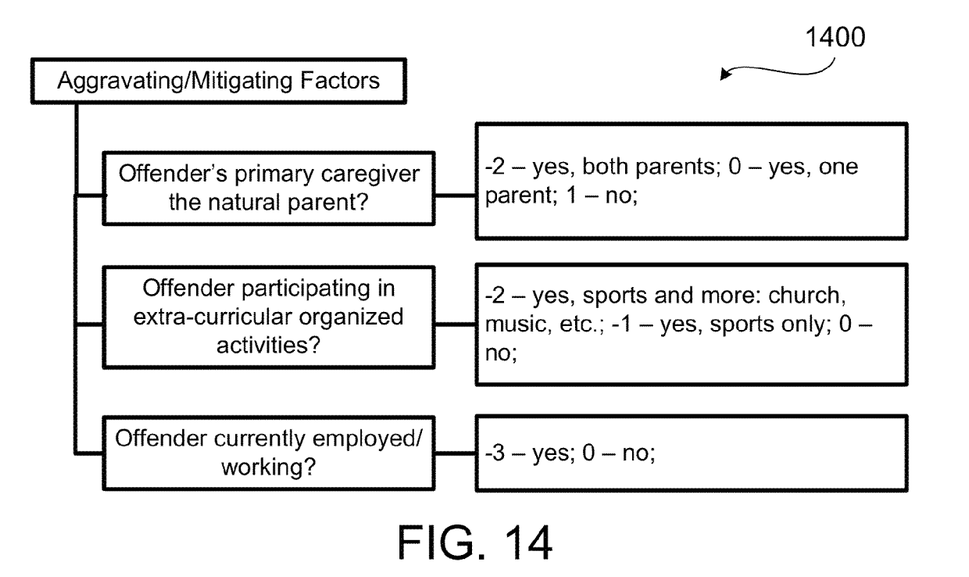
FIG. 14 illustrates a sample set of mitigating/aggravating factors for evaluating juvenile offenders.
Figure 15:
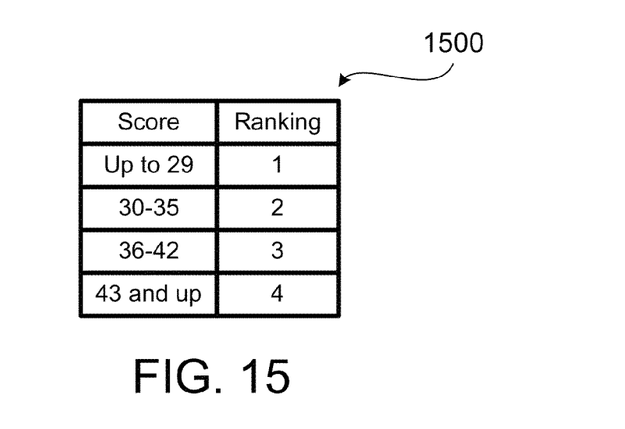
FIG. 15 illustrates a sample ranking criterion for evaluating juvenile offenders.

FIG. 13 illustrates another set of assessment criteria 1300 for screening juvenile offenders. The mitigating/aggravating factors 1400 for screening the juvenile offenders are shown in FIG. 14. The assessment criteria 1300 and the mitigating/aggravating factors 1400 are applied in a manner similar to those criteria 1100 of FIG. 11. After assessing a juvenile offender using the criteria 1300 and the mitigating/aggravating criteria 1400, the juvenile offender can be ranked according to the ranking criteria 1500 of FIG. 15 and proper action can be taken. The criteria shown in FIGS. 11-15 are exemplary and other criteria can be established in a similar manner according to the needs from a requesting agency.

The method of the present invention can be performed by a program resident in a computer readable medium, where the program directs a computer device, such as a remote device of the present invention, having a computer platform to perform the steps of the method. The computer readable medium can be the memory of the server. More specifically, the steps described by FIGS. 7-9 can be easily implemented using the system illustrated in FIG. 3. The data communication center 314 can receive social behavior information from different information sources and also can receive multiple monitoring criteria from different requesting agencies. The analyzer 318 performs most of the analysis. The analyzer 318 assigns weights for each social behavior according to the monitoring criteria received and analyzes the social behaviors according to the monitoring criteria received. Because a single social behavior may be assigned different weight depending on the monitoring criteria for a particular agency, a set of social behaviors may yield to different total scores for different agencies or for different monitoring criteria. The analyzer 318 calculates the total score according to the monitoring criteria and the requesting agency. The analyzer 318 will also compare the total score against a threshold in the set of monitoring criteria and then generate an indicator if the total score exceeds the threshold. The indicator can then be sent to the monitoring agency. It is understood by those skilled in the art that the analysis steps described above, though performed by the analyzer 318, can be performed by the CPU 316 or a combination of the analyzer 318 and the CPU 316.

In the context of FIG. 3, the remote supervision server 220 may have different components different from those illustrated in FIG. 3 for multiple components may be combined in a single component and the functions executed by one component in FIG. 3 may be executed by two or more components. In the context of FIGS. 4-5, the steps illustrated do not require or imply any particular order of actions. The actions may be executed in sequence or in parallel.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A server comprising:
    a data communication controller receiving from a plurality of requesting agencies, through a telecommunication network, a plurality of social behaviors for a particular neighborhood and a plurality of monitoring criteria, each monitoring criteria being associated with a requesting agency from the plurality of requesting agencies; and
    an analyzer being capable of
        assigning a weight for each social behavior according to the monitoring criteria,
        calculating a total score for the monitoring criteria,
        comparing the total score against the monitoring criteria, and
        generating an indicator if the total score matches a criterion in the monitoring criteria,
    wherein the data communication controller sends the indicator to the requesting agency from which the monitoring criteria is received.

2. The apparatus of claim 1, wherein the indicator is an unemployment rate and the requesting agency is a law enforcement agency.

3. The method of claim 1, wherein the indicator is an ethnic composition of the neighborhood and the requesting agency is a school district agency.

4. The apparatus of claim 1, wherein the indicator is a house vacancy rate and the requesting agency is a law enforcement agency.

5. The apparatus of claim 1, wherein the indicator is an unemployment rate for people from a particular age group and the requesting agency is a social service agency.

6. The apparatus of claim 1, wherein the weight assigned to each social factor depends on identity of the requesting agency.

7. A method, executed by a supervision server, for monitoring social changes in a neighborhood and providing indicators to a plurality of requesting agencies, comprising the steps of:
    receiving, by a data communication controller and through a telecommunication network, from the plurality of requesting agencies, a plurality of social behaviors for a particular geographical region;
    receiving, by the data communication controller, a set of monitoring criteria from a requesting agency from the plurality of requesting agencies;
    assigning a weight for each social behavior according to the monitoring criteria;
    analyzing, by an analyzer, a set of social behaviors according to the monitoring criteria;
    calculating a total score for the monitoring criteria;
    comparing the total score against the monitoring criteria;
    generating an indicator if the total score matches a criterion in the monitoring criteria; and
    sending, by the data communication controller, the indicator to the requesting agency.

8. The method of claim 7, wherein the indicator is an unemployment rate and the requesting agency is a law enforcement agency.

9. The method of claim 7, wherein the indicator is an ethnic composition of the neighborhood and the requesting agency is a school district agency.

10. The method of claim 7, wherein the indicator is a house vacancy rate and the requesting agency is a law enforcement agency.

11. The method of claim 7, wherein the indicator is an unemployment rate for people from a particular age group and the requesting agency is a social service agency.

12. The app method of claim 7, wherein the weight assigned to each social factor depends on identity of the requesting agency.

* * * * *